(12) United States Patent  
St. Clair

(10) Patent No.: US 7,401,795 B2
(45) Date of Patent: Jul. 22, 2008

(54) HAND OPERATED BRAKE ASSEMBLY FOR A SHOPPING CART

(76) Inventor: Tim St. Clair, 336 W. Exchange, Kahoka, MO (US) 63445

( * ) Notice: Subject to any disclaimer, the term of this patent is extended or adjusted under 35 U.S.C. 154(b) by 0 days.

(21) Appl. No.: 11/784,619

(22) Filed: Apr. 9, 2007

(65) Prior Publication Data

US 2007/0235961 A1 Oct. 11, 2007

Related U.S. Application Data

(60) Provisional application No. 60/790,222, filed on Apr. 7, 2006.

(51) Int. Cl.
*B62D 39/00* (2006.01)

(52) U.S. Cl. ............................ 280/33.994; 280/33.991; 280/33.992

(58) Field of Classification Search ............. 280/33.994
See application file for complete search history.

(56) References Cited

U.S. PATENT DOCUMENTS

| | | | | | |
|---|---|---|---|---|---|
| 2,958,537 | A | * | 11/1960 | Young | 280/33.994 |
| 3,458,015 | A | * | 7/1969 | Collins et al. | 188/29 |
| 3,500,965 | A | * | 3/1970 | Antin et al. | 188/29 |
| 3,501,164 | A | * | 3/1970 | Peterson | 280/33.994 |
| 3,717,225 | A | * | 2/1973 | Rashbaum et al. | 188/29 |
| 3,763,966 | A | * | 10/1973 | Close | 188/5 |
| 4,840,388 | A | * | 6/1989 | Doughty | 280/33.994 |
| 4,976,447 | A | * | 12/1990 | Batson | 280/33.994 |
| 5,199,534 | A | * | 4/1993 | Goff | 188/74 |
| 5,288,089 | A | * | 2/1994 | Bowers et al. | 280/33.994 |
| 5,390,942 | A | * | 2/1995 | Schuster et al. | 280/33.994 |
| 5,735,367 | A | | 4/1998 | Brubaker | |
| 6,199,878 | B1 | * | 3/2001 | Masserant et al. | 280/33.994 |
| 6,286,630 | B1 | | 9/2001 | Obergfell | |
| 6,834,869 | B1 | | 12/2004 | Adams | |
| 2004/0041462 | A1 | * | 3/2004 | Hicks | 301/105.1 |
| 2005/0194218 | A1 | | 9/2005 | D'Area | |
| 2005/0194219 | A1 | | 9/2005 | D'Area et al. | |

* cited by examiner

*Primary Examiner*—Christopher Ellis
*Assistant Examiner*—Katy Meyer
(74) *Attorney, Agent, or Firm*—James Ray & Assoc.

(57) ABSTRACT

A brake assembly for a shopping cart includes an elongated shaft and a pair of pivots for pivotally attaching the elongated shaft to each rear leg of the shopping cart. A pair of L-shaped members is secured to the elongated shaft and movable for frictionally engaging a respective rear wheel of the shopping cart. An actuating lever is attached to one end of the elongated shaft and is manually operable for moving the L-shaped members. A detent and guide member is secured to the shopping cart in proximity to its rearwardly disposed handle bar for guiding movement of the actuating lever. A ring couples the actuating lever to the detent and guide member.

17 Claims, 3 Drawing Sheets

HAND OPERATED BRAKE ASSEMBLY FOR A SHOPPING CART

CROSS-REFERENCE TO RELATED APPLICATIONS

This application is related to and claims priority from Provisional Patent Application Ser. No. 60/790,222 filed Apr. 7, 2006.

FIELD OF THE INVENTION

The present invention relates, in general, to hand brakes and, more particularly, this invention relates to a hand operated brake assembly for a shopping cart.

BACKGROUND OF THE INVENTION

One problem continuously experienced in using a shopping cart is in preventing its movement on an uneven surface while loading goods into the vehicle. Commonly, the shopping cart is positioned for abutting the vehicle in order to prevent its movement. However, this method is not very effective during windy conditions as the shopping cart rolls off unexpectedly often causing surface damages to vehicles.

Another difficulty in using the shopping cart is experienced when a small child must be placed into the seat of the shopping cart. The effort of holding the shopping cart still while placing the child into the seat is often frustrating to parents and potentially dangerous to the child if the parent is unable to hold the shopping cart still.

Prior to the present invention, efforts have been made to alleviate the problem of preventing movement of the shopping cart. U.S. Pat. No. 6,834,869, U.S. Pat. No. 6,286,630, U.S. Pat. No. 6,199,878, U.S. Pat. No. 5,735,367, U.S. Pat. No. 5,390,942, U.S. Pat. No. 5,199,534 and Published Applications No. 2005/0194218 and 2005/0194219 are representative of various types of brake assemblies for preventing movement of the shopping cart. However, the prior art brake assemblies have several disadvantages. One disadvantage is due to a greater than desirable complexity of such prior art brake assemblies. Another disadvantage is due to modifications that are required in the existing shopping carts in order to use prior art brake assemblies. Yet another disadvantage is due to difficulty in stacking shopping carts that have been equipped with prior art brake assemblies.

SUMMARY OF THE INVENTION

The invention provides a brake assembly for a shopping cart having a basket, a pair of rear legs, a pair of ground engaging rear wheels, a rearwardly disposed handle bar, and a lower shelf or frame. According to one embodiment, the brake assembly includes an elongated shaft. A pair of pivot means is provided for pivotally attaching the elongated shaft to each rear leg in proximity to the pair of rear wheels. A pair of rear wheel engaging means is secured to the elongated shaft each frictionally engaging a respective rear wheel. An actuating lever has a first end thereof attached to one end of the elongated shaft and has a second end thereof manually operable for moving the actuating lever between a first position wherein each rear wheel engaging means is spaced from the respective rear wheel and a second position wherein each rear wheel engaging means frictionally engages the respective rear wheel for preventing rotation thereof and for preventing movement of the shopping cart. A detent and guide means is secured to the shopping cart in proximity to the rearwardly disposed handle bar for guiding movement of the actuating lever between the first and the second position and for positively retaining the actuating lever in the second position. A coupling means is provided for coupling the second end of the actuating lever to the detent and guide means.

According to another embodiment, the brake assembly an elongated shaft and a pivot means for pivotally attaching the elongated shaft to one of the pair of rear legs in proximity to a respective rear wheel. A rear wheel engaging means is provided for movement between a first position being spaced from the respective rear wheel and a second position for frictionally engages the respective rear wheel when the user of the shopping cart applies pressure thereto. A bias means is provided for returning the rear wheel engaging means into the first position.

OBJECTS OF THE INVENTION

It is, therefore, one of the primary objects of the present invention to provide a brake assembly for a shopping cart.

Another object of the present invention is to provide a brake assembly for a shopping cart which is hand operated.

Yet another object of the present invention is to provide a brake assembly for a shopping cart which is simple to install.

A further object of the present invention is to provide a brake assembly for a shopping cart which does not require modifications to shopping carts presently in use.

Yet a further object of the present invention is to provide a brake assembly for a shopping cart which enables ease of stacking equipped shopping carts in a conventional manner.

An additional object of the present invention is to provide a brake assembly for a shopping cart which does not require use of special tools during installation of the brake assembly onto the shopping cart.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
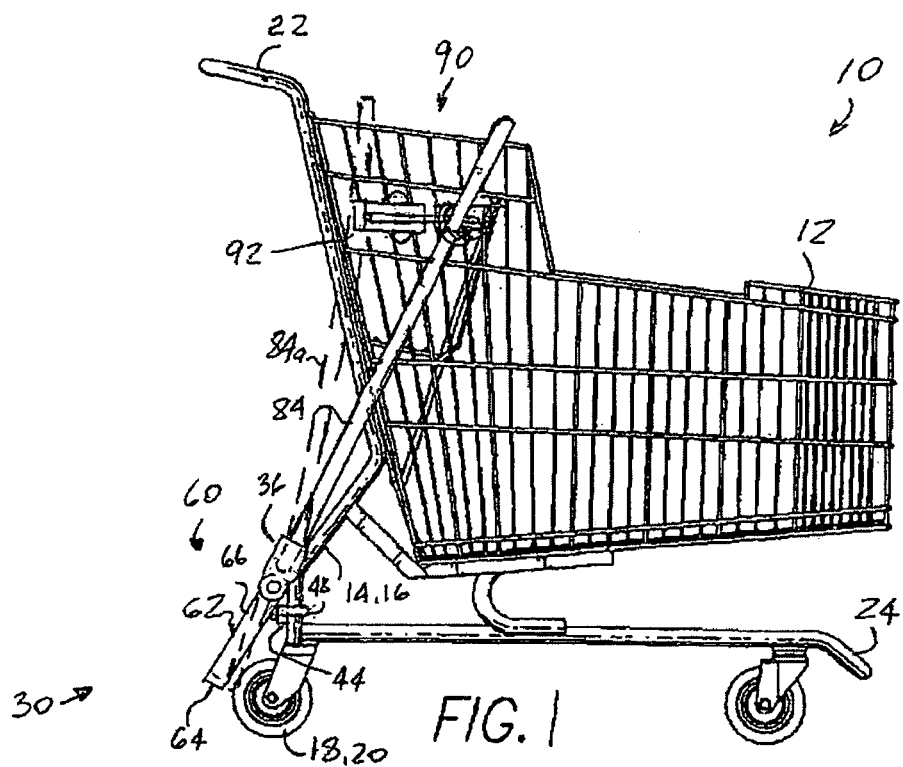
FIG. 1 is a side elevation view of a brake assembly constructed according to a presently preferred embodiment of the invention.
Figure 2:
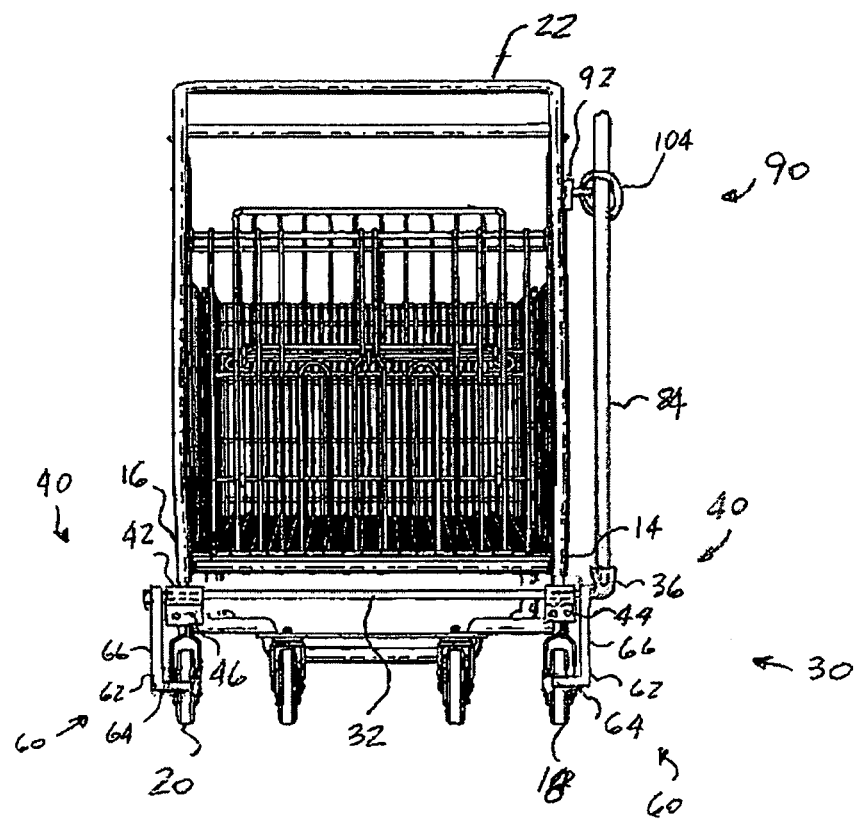
FIG. 2 is a rear elevation view of the brake assembly of FIG. 1.
Figure 3:
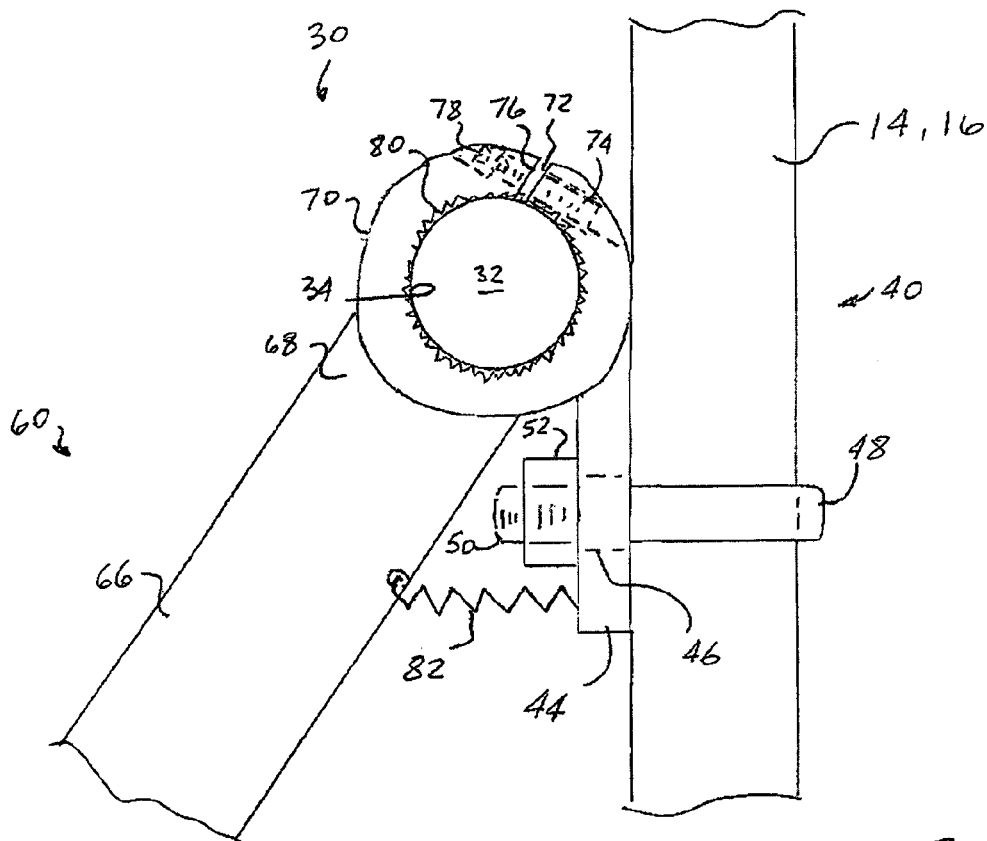
FIG. 3 is a partial side elevation view of the brake assembly of FIG. 1, particularly illustrating wheel engaging means.

Prior to proceeding to the more detailed description of the present invention, it should be noted that, for the sake of clarity and understanding, identical components which have identical functions have been identified with identical reference numerals throughout the several views illustrated in the drawing figures.

Reference is now made, to FIGS. 1-5, wherein there is shown a conventional shopping cart, generally designated as 10. Briefly, the shopping cart 10 has a basket 12, shown in FIG. 1 as having a well known wire type construction, a pair of rear legs 14, 16, a pair of ground engaging rear wheels 18, 20, a rearwardly disposed handle bar 22, and a lower shelf or frame 24.

A brake assembly, generally designated as 30, is provided for preventing movement of the shopping cart 10 when such brake assembly 30 is operable by the user of the shopping cart 10.

Figure 5:
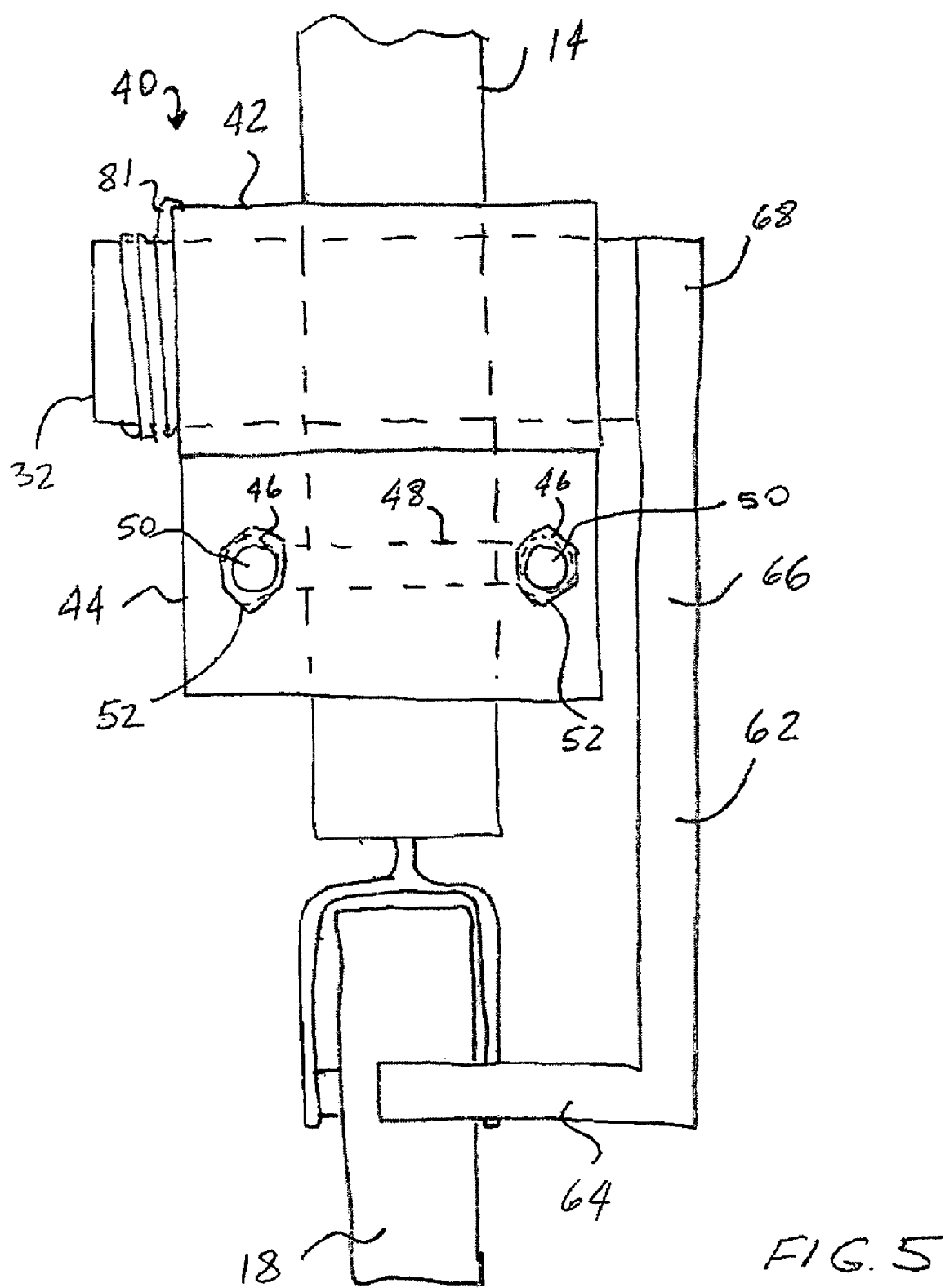
FIG. 5 is an elevation view of a brake assembly constructed according to another embodiment of the invention.

According to one embodiment of the invention, shown in FIG. 5, the brake assembly 30 includes an elongated shaft 32 which has each of a predetermined length and a predetermined cross-section. The presently preferred predetermined cross-section of the elongated shaft 32 is round. A pivot means, generally designated as 40, is provided for pivotally attaching the elongated shaft 32 to one rear leg, which is shown as the right rear leg 14 in FIG. 5 and in proximity to the rear wheel 18. The pivot means 40 has a hollow tubular shaped member 42 for receiving the elongated shaft 32 for pivoting therein. A flange member 44 is rigidly attached to and extends from an exterior surface of the hollow member 42. Preferably, the flange 44 is formed integral with the tubular member 42. A pair of spaced apertures 46 are formed in the flange member 44. A U-shaped clamp member 48, which has threaded ends 50, is provided for securing the flange member 44 to the rear leg 14. Simply, the clamp member 48 is positioned in abutting relationship with the rear leg 14 and its threaded ends 50 are inserted through the apertures 46 in the flange member 44 and threaded fasteners 52, such as well known threaded nuts, are employed to threadeably engage ends 50 and secure the flange member 44 to the rear leg 14. The longitudinal axis of the hollow tubular member 42 and the longitudinal axis of the elongated shaft 32 are horizontally disposed.

A rear wheel engaging means, generally designated as 60, is provided for frictionally engaging the rear wheel 18 in order to prevent rotation thereof. Such means 60 includes an L-shaped member 62 having a first leg 64 thereof positioned for frictionally engaging the rear wheel 18. The free end 68 of the second leg 66 is attached to one end of the elongated shaft 32 for rotation therewith. The L-shaped member 62 may be rigidly attached to the elongated shaft 32 by fastening or by welding and may be integrally formed with the elongated shaft 32 by a casting or molding process depending on the preselected materials of manufacture.

It is presently preferred to adjustably secure the L-shaped member 64 to the elongated shaft 32. Now in reference to FIG. 3, an annular ring 70 is disposed on and secured to the end 68 of the L-shaped member 64. The annular ring 70 is sized to receive the elongated shaft 32 therein. A slit 72 is formed in the annular ring 70. A threaded aperture 74 is formed in a portion of the annular ring 70 adjacent one side of the slit 72 and an aperture 76 is formed in a portion of the annular ring 70 adjacent an opposed side of the slit 72 and in alignment with the threaded aperture 74. The aperture 76 is sized for receiving a threaded fastener 78 therethrough and for enabling threaded engagement of the threaded fastener 78 with the threaded aperture 74, wherein the fastener 78 is manually operable to clamp the annular ring 70 on an exterior surface of the elongated shaft 32. An additional securing means, such as a male spline portion 34 formed on the elongated shaft 32 and a complimentary female spline portion 80 formed within the annular ring 70 may be optionally provided to secure the L-member 62 to the elongated shaft 32.

A biasing member, such as a well known torsion spring 81, is provided for biasing the first leg 64 away from the rear wheel 18. Alternatively, such biasing member may be a well known compression spring 82 shown in FIG. 3.

In use, the pivot means 40 is simply attached to the rear leg 14 and the elongated shaft 32 is inserted into the tubular member 42. The rear wheel engaging means 60 is attached to one end of the elongated shaft 32 and is initially adjusted to position the first leg 64 at a predetermined distance away from the peripheral outer edge of the rear wheel 18. In order to prevent rotation of the rear wheel 18 and, more particularly, to prevent movement of the shopping cart 10, the user simply steps onto the L-shaped member 62 and applies pressure forcing the first leg 64 into frictional engagement with the rear wheel 18. When the user removes the foot from engagement with the L-shaped member 62, the biasing member 81 or 82 moves the first leg 64 away from the rear wheel 18.

It will be appreciated that ability to initially adjust the position of the rear wheel engaging means 60 relative to the rear wheel 18 and ability to adjustably secure the pivot means 40 onto the rear leg 14 enables employment of the brake assembly 30 of the above described embodiment on wide variety of shopping carts 10 presently in use without requiring any structural modifications to such shopping carts 10.

Furthermore, the present invention contemplates that when the brake assembly 30 is to be used with a specific type of the shopping cart 10, the pivot means 40 may be rigidly attached to the rear leg 14, for example by a welding process, during manufacturing of the shopping cart 10. Furthermore, the rear wheel engaging means 60 may be rigidly or integrally attached to the elongated shaft 32 in a manner that would position the first leg 64 in the released position away from the rear wheel 18.

To improve reliability of the effort to prevent movement of the shopping cart 10, the present invention contemplates frictional engagement with both rear wheels 18 and 20.

Accordingly, a second pivot means 40 is secured to the second rear leg 16 in a vertical alignment with the pivot means 40 secured to the rear leg 14. The length of the elongated shaft 32 is extended to be received within the second tubular member 42. The second rear wheel engaging means 60 is secured to the elongated shaft 32 in proximity to the second rear wheel 20. Therefore, when the user steps onto any one of the pair of rear wheel engaging means 60, both rear wheels 18 and 20 will be frictionally engaged. When extended across the width of the shopping cart 10, the elongated shaft 32 is vertically positioned to allow passage of the lower shelf 24 of another shopping cart 10 for stacking shopping carts 10 in a conventional manner wherein the baskets 12 of adjacent shopping carts 10 are interposed with each other.

It will be apparent to those skilled in the art that the brake assembly 30 constructed according to the embodiments discussed supra will prevent movement of the shopping cart 10 for as long as the user applies pressure, with his or her foot, to the rear wheel engaging means 60.

Since it has been found that there is a need to prevent movement of the shopping cart 10 in a semi-permanent manner while freeing the user to attend to required tasks as well as to provide for a relatively low operating force, the brake assembly 30 which is constructed according to the presently preferred embodiment of the invention includes an actuating lever 84 which has a first end thereof attached to one end of the elongated shaft 32 and which has a second end thereof positioned for enabling the user to operate the brake assembly 30 with his or her hand. Thus, the actuating lever 84 is manually movable along the side of the basket 12 between a first position wherein the rear wheel engaging means 60 is spaced from the rear wheels 18, 20 and a second position wherein the rear wheel engaging means 60 frictionally engages at least one rear 18, 20 wheel for preventing rotation thereof and for preventing movement of the shopping cart 10.

Figure 4:
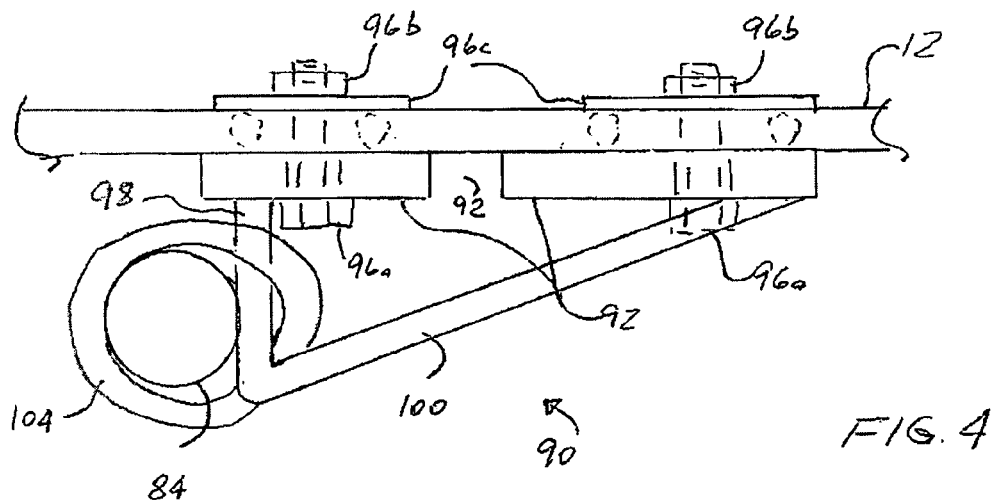
FIG. 4 is a partial planar view of the brake assembly of FIG. 1, particularly illustrating detent and guide means of the present invention.

Furthermore, the brake assembly 30 includes a detent means, generally designated as 90, for retaining the actuating lever 84 in the second position when the user removes his or her hand from engagement with the actuating lever 84. By way of example in FIGS. 1 and 4, such detent means 90 includes a mounting plate 92 having a pair of apertures 94 formed therein for releaseably securing the mounting plate 92 to the side of the basket 12 with threaded fasteners 96a, 96b and washers 96c. A detent member 98, having a predetermined length, outwardly extends from the mounting plate 92 in the generally horizontal direction for engagement with the actuating lever 84 moved into the second position, as best shown in FIG. 4. In order for the actuating lever 84 to move outwardly from the side of the basket 12 and pass by the detent member 98 without obstruction, the actuating lever 84 may be pivotally connected to the elongated shaft 32 to enable such outward movement.

It is presently preferred to provide a simple hollow portion 36 which is disposed on and secured to the end of the elongated shaft 32 and which is sized for receiving one end of the actuating lever 84 preferably in a tightly fitting arrangement which can be further augmented with a mechanical fastener (not shown) or with use of an adhesive (not shown). It is further presently preferred to manufacture the actuating lever 84 from an elastic material which can flex while passing the detent member 98 and which can flex and remain under tension during engagement with the detent member 98 in the second actuating or brake applied position as shown by reference 84 a in FIG. 1. It will be appreciated that the actuating lever 84 shall retain its original shape when moved into the first non-actuating or brake released position. Nylon, nylon polyurethane or a woven metal mesh as the matrix in a polymer composite are some of the examples of the materials suitable for manufacturing the actuating lever 84. It will be appreciated that the longitudinal axis of the hollow portion 36 is oriented to return the actuating lever 84 to its normal shape when the actuating lever 84 is moved into the first non-actuating or brake released position.

Preferably, the brake assembly 30 includes means for guiding movement of the actuating lever 84 between first and second positions. By way of an example only, such means includes a guide member 100 which is added to the detent means 90 by virtue of having a first end thereof secured to the free end of the detent member 98 and which has a second end thereof secured to the mounting plate 92. It will be appreciated that a combination of the detent member 98 and the guide member 100 may be formed as a unitary construction. Furthermore, a combination of the mounting plate 92, detent member 98 and the guide member 100 may be formed as a unitary construction for example by a casting or a molding process. A simple ring member 104 couples the actuating level 84 to the combination of the detent member 98 and the guide member 100 with a predetermined clearance for guiding movement of the actuating level 84 between the first and second positions. It has been found that such arrangement facilitates movement of the actuating lever 84 into first non-actuating or brake released position when the user moves the actuating lever 84 outwardly from the side of the basket 12 to disengage the actuating lever 84 from the detent member 98. It has been also found advantageous to position the guide member 100 downwardly at an angle from the detent member 98 to facilitate movement of the actuating shaft 84 into the first position. Such angle may be preferably about 15 degrees.

In order to simply install ring 104, the mounting plate 92 has been adapted with a slit 102 sufficient to pass the ring 104 therethrough prior to attachment of the mounting plate 92 to the side of the basket 12.

It will be appreciated that at least one biasing member 81 or 82 may be optionally employed with the brake assembly 30 having such actuating lever 84 and detent and guide means 90.

The actuating lever 84 of the presently preferred embodiment of the invention has a diameter of about 0.75 inches and length of about 3 feet which has been found advantageous in achieving a low operative force of about 3 pounds to move the actuating lever 84 into the second actuating or brake applied position. However, the present invention contemplates that other lengths and shapes of the actuating lever 84 may be provided within the brake assembly 30 depending on the construction of the shopping cart 10.

It has been also found that the brake assembly 30 of the present invention being positioned at the rear of the shopping cart 10 enables ease of stacking a plurality of shopping carts 10 in a conventional manner wherein the baskets 12 of adjacent shopping carts 10 are interposed with each other.

Additionally, only conventional hand tools are required to install the brake assembly 30 onto the shopping cart 10.

Although the present invention has been shown in terms of using the brake assembly 30 with the shopping cart 10 having a wire type basket 12, it will be apparent to those skilled in the art, that the present invention may be applied to basket 12 which is manufactured from molded plastic with and without the apertures. If the basket 12 is provided without apertures suitable for using the fasteners 96, such apertures can be simply drilled in the selected side of the basket 12.

Furthermore, it will be apparent to those skilled in the art that that the actuating lever 84 can be positioned for either left hand or right hand operation as well as a pair of actuating levers 84 may be provided for operating the brake assembly 30 from either side of the basket 12 depending on user's preference.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A brake assembly for a shopping cart having a basket, a pair of rear legs, a pair of ground engaging rear wheels, a rearwardly disposed handle bar, and a lower shelf or frame, said brake assembly comprising:
   (a) an elongated shaft;
   (b) a pair of pivot means for pivotally attaching said elongated shaft to each rear leg in proximity to the pair of rear wheels;
   (c) a pair of rear wheel engaging means each secured to said elongated shaft for frictionally engaging a respective rear wheel;
   (d) an actuating lever having a first end thereof attached to one end of said elongated shaft and having a free second end thereof positioned along one side of such basket and manually graspable and movable thereabout between a first position wherein said each rear wheel engaging means is spaced from the respective rear wheel and a second position wherein said each rear wheel engaging means frictionally engages the respective rear wheel for preventing rotation thereof and for preventing movement of the shopping cart;

(e) a detent and guide means which is secured to such one side of such basket of the shopping cart in proximity to the rearwardly disposed handle bar for guiding movement of said second end of said actuating lever between said first and said second position and for positively retaining said actuating lever in said second position; and (f) a coupling means for coupling said second end of said actuating lever to said detent and guide means.

2. The brake assembly, according to claim 1, wherein said elongated shaft has at least one spline portion formed on an exterior surface thereof.

3. The brake assembly, according to claim 1, wherein said brake assembly includes a hollow portion disposed on and secured to one end of said elongated shaft for receiving said one end of said actuating lever.

4. The brake assembly, according to claim 1, wherein said pivot means includes a hollow tubular member for receiving said elongated shaft and a clamp means for attaching said hollow tubular member to a respective rear leg of the shopping cart.

5. The brake assembly, according to claim 4, wherein said clamp means includes a flange member which is attached to and extends from an exterior surface of said hollow member, a pair of spaced apertures formed in said flange member, a U-shape member wrapped about said rear leg and having each threaded end thereof passed through a respective aperture and a pair of threaded fasteners each operably engaging a respective threaded end of said U-shaped member for stationary securing said flange to the respective rear leg in abutting relationship therewith.

6. The brake assembly, according to claim 1, wherein said each wheel engaging means includes an L-shaped member having a first leg thereof positioned for frictionally engaging the respective rear wheel when said actuating lever is moved into said second position and means for adjustably securing a free end of a second leg to said elongated shaft.

7. The brake assembly, according to claim 6, wherein said securing means includes an annular ring sized to receive said elongated shaft, a slit formed in said annular ring, a threaded aperture formed in a portion of said annular ring adjacent one side of said slit and an aperture formed in a portion of said annular ring adjacent an opposed side of said slit and in alignment with said threaded aperture, said aperture is sized for receiving a threaded fastener therethrough and for enabling a threaded engagement of said threaded fastener with said threaded aperture, wherein said threaded fastener is manually operable to clamp said annular ring on an exterior surface of said elongated shaft.

8. The brake assembly, according to claim 6, wherein said securing means further includes a first spline portion formed on said elongated shaft and a complimentary second spline portion formed within said annular ring.

9. The brake assembly, according to claim 1, wherein said detent and guide means includes a mounting plate having a pair of apertures formed therein for releaseably securing said mounting plate to a side portion of the basket with a pair of threaded fasteners and washers and a detent member which extends outwardly from one end of said mounting plate.

10. The brake assembly, according to claim 9, wherein said detent and guide means further includes a guide member which is secured to a free end of said detent member and to a distal end of said mounting plate.

11. The brake assembly, according to claim 1, wherein said actuating lever is formed from a material enabling said actuating lever to flex and remain under tension when moved into said second position and return to original shape when moved into said first position.

12. In combination with a shopping cart having a basket, a pair of rear legs, a pair of ground engaging rear wheels, a rearwardly disposed handle bar, and a lower shelf or frame, a brake assembly comprising:

(a) an elongated shaft;

(b) a pivot means for pivotally attaching said elongated shaft to one of the pair of rear legs in proximity to a respective rear wheel, said pivot means having a hollow tubular member for receiving a portion of said elongated shaft therewithin and aligning a longitudinal axis of said elongated shaft in a horizontal direction and parallel to rotational axis of the rear wheels, said pivot means further having a flange disposed on and secured to an exterior surface of said hollow tubular member;

(c) a rear wheel engaging means engageable with said elongated shaft for movement between a first position wherein said rear wheel engaging means is spaced from the respective rear wheel and a second position wherein said rear wheel engaging means frictionally engages the respective rear wheel when the user of the shopping cart applies pressure thereto;

(d) a bias means for returning said rear wheel engaging means into said first position; and (e) a clamp apparatus having a pair of spaced apart apertures formed through said flange, a U-shaped member wrapped about said rear leg and having each threaded end thereof passed through a respective aperture and a pair of threaded fasteners each operably engaging a respective threaded end of said U-shaped member for stationary securing said flange to said rear leg in abutting relationship therewith.

13. The combination, according to claim 11, wherein said rear wheel engaging means includes an L-shaped member having a first leg thereof positioned for said frictional engagement with the respective wheel and having a free end of a second leg thereof disposed on and secured to said elongated shaft.

14. The combination, according to claim 12, wherein said L-shaped member is formed integral with said elongated shaft.

15. The combination, according to claim 12, wherein said rear wheel engaging means further include means for adjustably securing said L-shaped member to said elongated shaft.

16. The combination, according to claim 11, wherein said bias means includes a torsion spring.

17. A brake assembly for a shopping cart having a basket, a pair of rear legs, a pair of ground engaging rear wheels, a rearwardly disposed handle bar, and a lower shelf or frame, said brake assembly comprising:

(a) a pair of pivots each positioned adjacent a junction of a respective rear leg and rear wheel, said each pivot having a hollow cylindrical member and a flange disposed on and secured to an exterior surface thereof, said flange having a pair of spaced apart apertures formed therehrough;

(b) a pair of U-shaped members each wrapped about the rear leg and having each threaded end thereof passed through a respective aperture formed through a respective flange for stationary securing said each pivot to the respective rear leg with a pair of threaded fasteners;

(c) an elongated shaft having a portion thereof received within said hollow cylindrical member of said each pivot, whereby a longitudinal axis of said elongated shaft is aligned parallel to rotational axis of the rear wheels;

(d) a pair of L-shaped members each having a first leg thereof secured to said elongated shaft and having a second leg thereof positioned for frictional engagement with the respective wheel;

(e) an actuating lever having a first end thereof attached to one end of said elongated shaft and having a free second end thereof positioned along one side of such basket and manually graspable and movable thereabout between a first position wherein said each rear wheel engaging means is spaced from the respective rear wheel and a second position wherein said each rear wheel engaging means frictionally engages the respective rear wheel for preventing rotation thereof and for preventing movement of the shopping cart;

(f) a detent and guide apparatus mounted in proximity to the rearwardly disposed handle bar, said detent and guide means including a mounting plate having a pair of apertures formed therethrough for releaseably securing said mounting plate to a side portion of the basket with a pair of threaded fasteners, said detent and guide means further including a bent elongated member secured to said mounting plate and having a first portion thereof disposed at an angle relative to said mounting plate, whereby said second end of said actuating lever is guided by said first portion and moves outwardly from the one side of such basket during movement of said second end from said first position into said second position, said bent elongated member having a second portion thereof extending perpendicular to said mounting plate for detenting and positively retaining said actuating lever in said second position; and (g) a ring engaging said actuating lever and said bent elongated member for coupling said actuating lever thereto.

* * * * *